(12) United States Patent
Hung et al.

(10) Patent No.: US 11,245,297 B2
(45) Date of Patent: Feb. 8, 2022

(54) ROTOR ASSEMBLY OF PERMANENT MAGNET MOTOR AND ROTOR END PLATE

(71) Applicant: TECO Electric & Machinery Co., Ltd., Taipei (TW)

(72) Inventors: Lian-Shin Hung, Taipei (TW); Ming-Te Ho, Taipei (TW); Po-Jen Chiu, Taipei (TW); Rung-Sheng Tsai, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 94 days.

(21) Appl. No.: 16/837,605

(22) Filed: Apr. 1, 2020

(65) Prior Publication Data

US 2021/0242738 A1 Aug. 5, 2021

(30) Foreign Application Priority Data

Jan. 31, 2020 (TW) ................................ 109102941

(51) Int. Cl.
*H02K 1/27* (2006.01)
*H02K 5/16* (2006.01)
*H02K 5/15* (2006.01)

(52) U.S. Cl.
CPC ......... *H02K 1/2786* (2013.01); *H02K 1/2706* (2013.01); *H02K 5/15* (2013.01); *H02K 5/161* (2013.01)

(58) Field of Classification Search
CPC .... H02K 1/2786; H02K 1/2706; H02K 5/161; H02K 5/15
USPC ................................ 310/40, 273, 261.1, 271
See application file for complete search history.

(56) References Cited

U.S. PATENT DOCUMENTS

| | | | |
|---|---|---|---|
| 2012/0146336 A1* | 6/2012 | Hori ..................... | H02K 1/2766 290/55 |
| 2015/0372576 A1* | 12/2015 | Hembroff ............ | H02K 17/165 310/211 |
| 2021/0091630 A1* | 3/2021 | Lahr ....................... | H02K 7/04 |

* cited by examiner

*Primary Examiner* — Tulsidas C Patel
(74) *Attorney, Agent, or Firm* — Muncy, Geissler, Olds & Lowe, P.C.

(57) ABSTRACT

A rotor assembly includes a rotor body having two rotor ends, a rotating shaft penetrating the two rotor ends, and two rotor end plates. The two rotor end plates are pressed to fit correspondingly the two rotor ends, and each rotor end plate includes an inner ring structure and an outer ring structure. The inner ring structure, made of an iron-based material and used to sleeve the rotating shaft, has a first outer-ring peripheral surface and a first thickness. The outer ring structure, made of an aluminum-based material, includes a first radial segment and a second radial segment. The first radial segment, wrapping the first outer-ring peripheral surface, has a second outer-ring peripheral surface and a second thickness larger than the first thickness. The second radial segment, wrapping integrally the second outer-ring peripheral surface as a unique piece, has a third thickness larger than the second thickness.

8 Claims, 7 Drawing Sheets

ROTOR ASSEMBLY OF PERMANENT MAGNET MOTOR AND ROTOR END PLATE

This application claims the benefit of Taiwan Patent Application Serial No. 109102941, filed Jan. 31, 2020, the subject matter of which is incorporated herein by reference.

BACKGROUND OF THE INVENTION

(1) Field of the Invention

The invention relates to a rotor assembly of a permanent magnet motor and a rotor end plate thereof, and more particularly to the rotor assembly of a permanent magnet motor that is furnished with the rotor end plate made of an iron-based or aluminum-based material.

(2) Description of the Prior Art

Referring to FIG. 1 and FIG. 2, a perspective view of a conventional motor rotor and a cross-sectional view thereof along line A-A are schematically shown, respectively. As illustrated, the motor rotor PA100 includes a rotor body PA1, a rotating shaft PA2 and two rotor end plates PA3, PA4. The rotor body PA1 can be formed by stacking tightly a plurality of silicon steel plates in parallel, and the rotating shaft PA2 is to penetrate, in a wearing manner, through the rotor body PA1. The two rotor end plates PA3, PA4 sleeving the rotating shaft PA2 individually are furnished to constrain the rotor body PA1 in between.

As described, a general rotor end plate PA3 or PA4 is mainly used for fixedly mounting magnets into the rotor body PA1. In addition, a mass-reduction or mass-addition process is usually to the rotor end plates PA3, PA4 so as to ensure a dynamic balance while in rotating the motor rotor PA100. Further, while in manufacturing, if the rotor end plates PA3, PA4 are thermally pressed to fit (not using screw bolts for interlocking), then the manufacturing cost would be substantially reduced for the cost upon the screw bolts and the corresponding drilled holes are waived. However, since high temperature would be induced while the motor rotor PA100 is running, thus if the rotor end plates PA3, PA4 are made of an aluminum material, then the rotor end plates PA3, PA4 would be easily separated from the rotating shaft PA2 due to thermal expansion. Hence, in order not to be separated from the rotating shaft PA2 caused by thermal expansion, the rotor end plates PA3, PA4 are usually made of cast iron whose thermal expansion coefficient is low.

In addition, since the hardness of the cast iron is higher than that of the aluminum, thus if the rotor end plates PA3, PA4 are made of cast iron, plenty excessive machining time would be required for machining the harder rotor end plates PA3, PA4 prior to the engagement between the rotor end plate PA3 or A4 and the rotating shaft PA2. Specifically, in the case that a mass-reduction process is needed for adjusting weight distribution of the motor rotor PA100 so as to obtain a dynamic rotational balance, the cast iron-made rotor end plate PA3 or PA4 would be too hard to be properly and accurately machined.

As described above, in the art, since the aluminum-made rotor end plate PA3 or PA4 would face a phenomenon of being separated from the rotating shaft PA2 due to thermal expansion on one hand, and the cast iron-made rotor end plate PA3 or PA4 would face a difficulty in machining on another hand, thus an improvement to have all these shortcomings to be resolved is definitely necessary.

SUMMARY OF THE INVENTION

In view that the conventional aluminum-made rotor end plate would face the problem of being separated from the rotating shaft due to thermal expansion and the cast iron-made rotor end plate would face another problem in difficult machining, thus, accordingly, it is an object of the present invention to provide a rotor assembly of a permanent magnet motor and a rotor end plate thereof to effectively resolve the conventional shortcomings of the rotor end plate in thermal expansion and machining difficulty.

In the present invention, a rotor assembly of a permanent magnet motor includes a rotor body, a rotating shaft and two rotor end plates. The rotor body has two rotor ends. The rotating shaft penetrates through the two rotor ends of the rotor body. The two rotor end plates are pressed to fit correspondingly the two rotor ends, and each of the rotor end plates includes an inner ring structure and an outer ring structure.

The inner ring structure, made of an iron-based material and used to sleeve the rotating shaft, has a first outer-ring peripheral surface and a first thickness. The outer ring structure, made of an aluminum-based material, includes a first radial segment and a second radial segment. The first radial segment, wrapping the first outer-ring peripheral surface, has a second outer-ring peripheral surface and a second thickness larger than the first thickness. The second radial segment, wrapping integrally the second outer-ring peripheral surface as a unique piece, has a third thickness larger than the second thickness.

In one embodiment of the present invention, the rotor body is furnished with a plurality of magnet-insertion holes, and each of the plurality of magnet-insertion holes is extended to connect the two rotor ends. Preferably, the rotor assembly of the permanent magnet motor further includes a plurality of magnets, each of the plurality of magnets being disposed inside one of the plurality of magnet-insertion holes. In addition, the outer ring structure has a plurality of magnet-positioning bumps. When the two rotor end plates are pressed to fit the corresponding two rotor ends, the plurality of magnet-positioning bumps is buckled respectively into the plurality of magnet-insertion holes so as to secure the plurality of magnets thereinside.

In one embodiment of the present invention, the rotor body is furnished with a rotating-shaft connection hole, the inner ring structure is furnished with a rotating-shaft passing hole corresponding to the rotating-shaft connection hole, and the rotating shaft penetrates through the rotating-shaft connection hole and the rotating-shaft passing hole.

In another aspect of the present invention, a rotor end plate, applied to be pressed to fit a rotor end of a rotor body, includes an inner ring structure and an outer ring structure. The inner ring structure, made of an iron-based material and used to sleeve a rotating shaft of the rotor body, has a first outer-ring peripheral surface and a first thickness. The outer ring structure, made of an aluminum-based material, includes a first radial segment and a second radial segment.

The first radial segment, wrapping the first outer-ring peripheral surface, has a second outer-ring peripheral surface and a second thickness larger than the first thickness. The second radial segment, wrapping integrally the second outer-ring peripheral surface as a unique piece, has a third thickness larger than the second thickness.

In one embodiment of the present invention, the rotor body is furnished with a plurality of magnet-insertion holes, the plurality of magnet-insertion hole is furnished individually thereinside a plurality of magnets, and the outer ring structure has a plurality of magnet-positioning bumps; wherein, when the rotor end plate is pressed to fit the rotor end, the plurality of magnet-positioning bumps is buckled individually into the plurality of magnet-insertion holes so as to secure the plurality of magnets thereinside.

In one embodiment of the present invention, the rotor body is furnished with a rotating-shaft connection hole, the inner ring structure is furnished with a rotating-shaft passing hole corresponding to the rotating-shaft connection hole, and the rotating shaft penetrates through the rotating-shaft connection hole and the rotating-shaft passing hole.

As stated above, the rotor end plate provided by this invention includes the inner ring structure made of the iron-based material and the outer ring structure made of the aluminum-based material. Thereupon, with the inner ring structure to connect the rotating shaft, then the conventional separation problem caused by thermal expansion can be effectively resolved; and, with the outer ring structure to adjust the weight for reaching a dynamic balance while in operating the rotor assembly, the machining in drilling holes would be much easier. In addition, the magnet-positioning bumps on the rotor end plate of the present invention can be buckled into the corresponding magnet-insertion holes, and thus the magnets can be secured inside the individual magnet-insertion holes.

All these objects are achieved by the rotor assembly of the permanent magnet motor and the rotor end plate thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a rotor assembly of a permanent magnet motor and a rotor end plate thereof In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
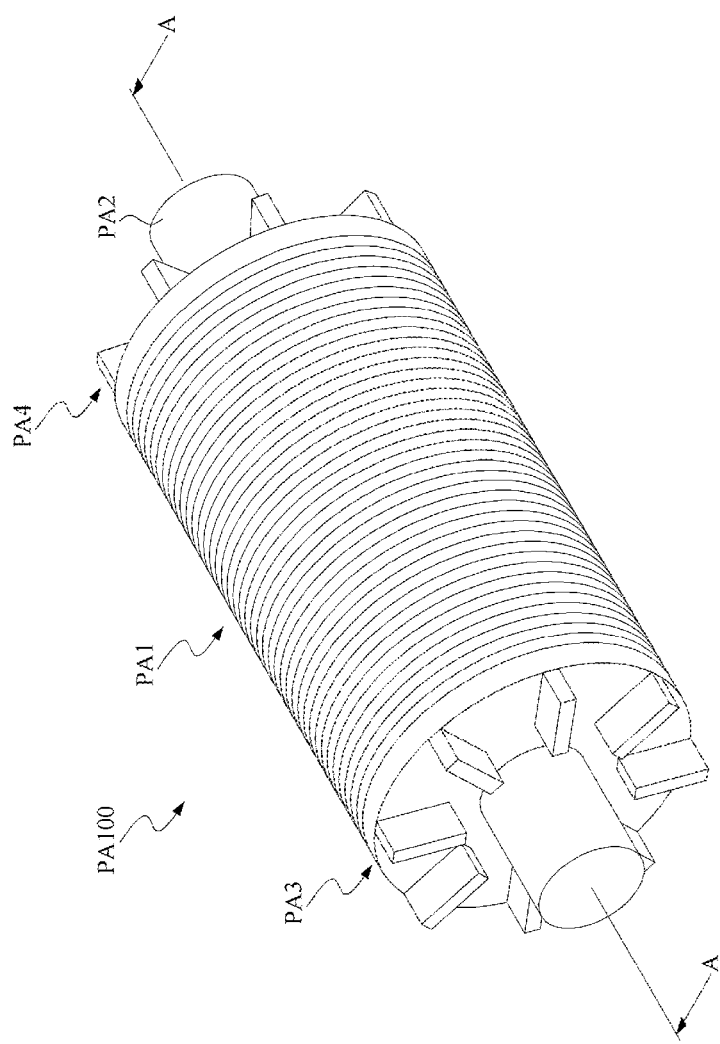
FIG. 1 is a schematic perspective view of a conventional motor rotor.
Figure 2:
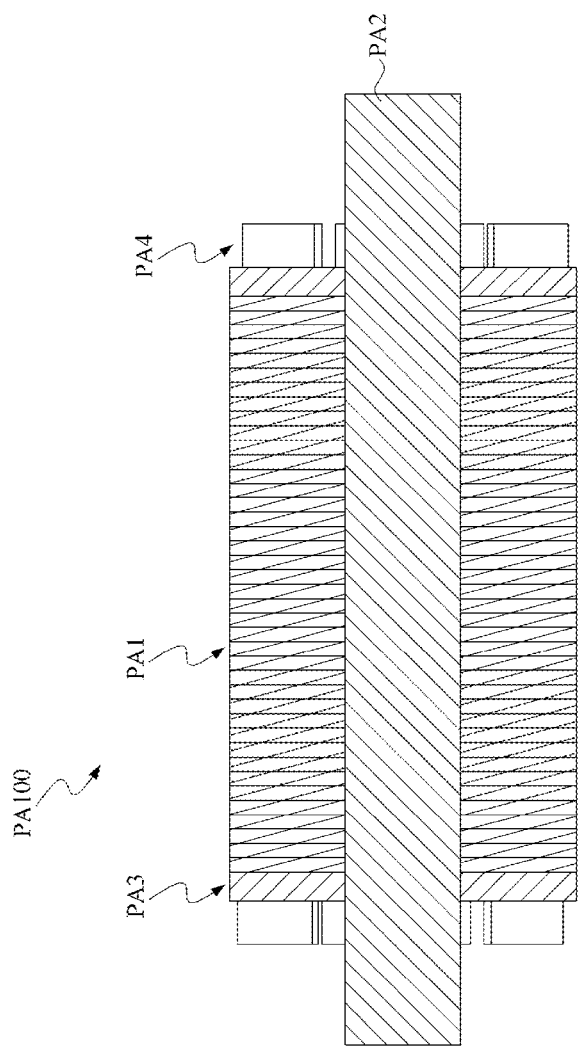
FIG. 2 is a schematic cross-sectional view of FIG. 1 along line A-A.
Figure 3:
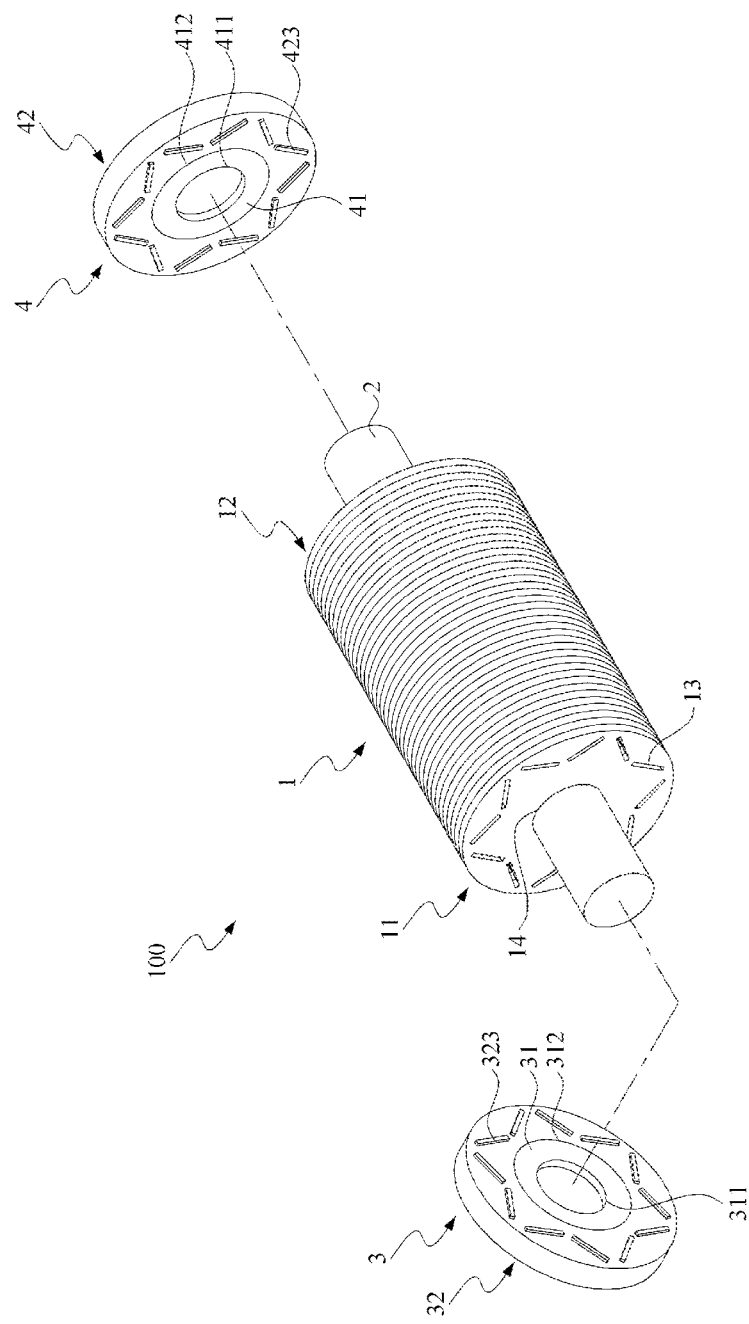
FIG. 3 is a schematic exploded view, at large, of a preferred rotor assembly for a permanent magnet motor in accordance with the present invention.
Figure 4:
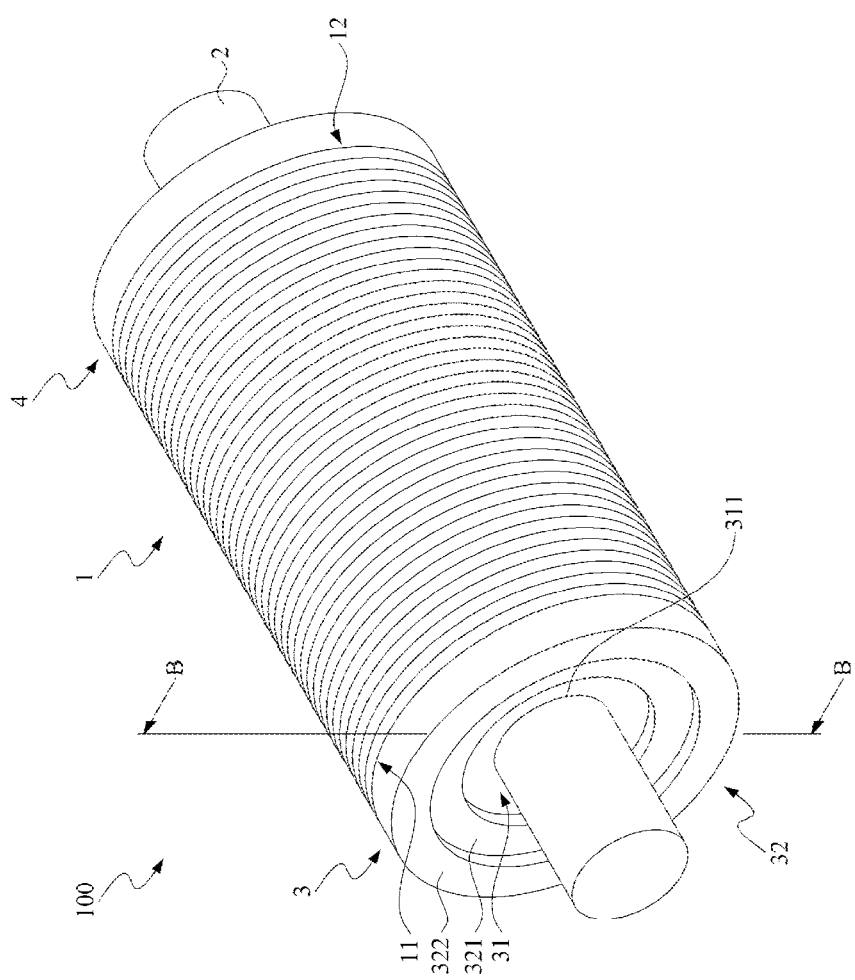
FIG. 4 is a schematic perspective view of FIG. 3.
Figure 5:
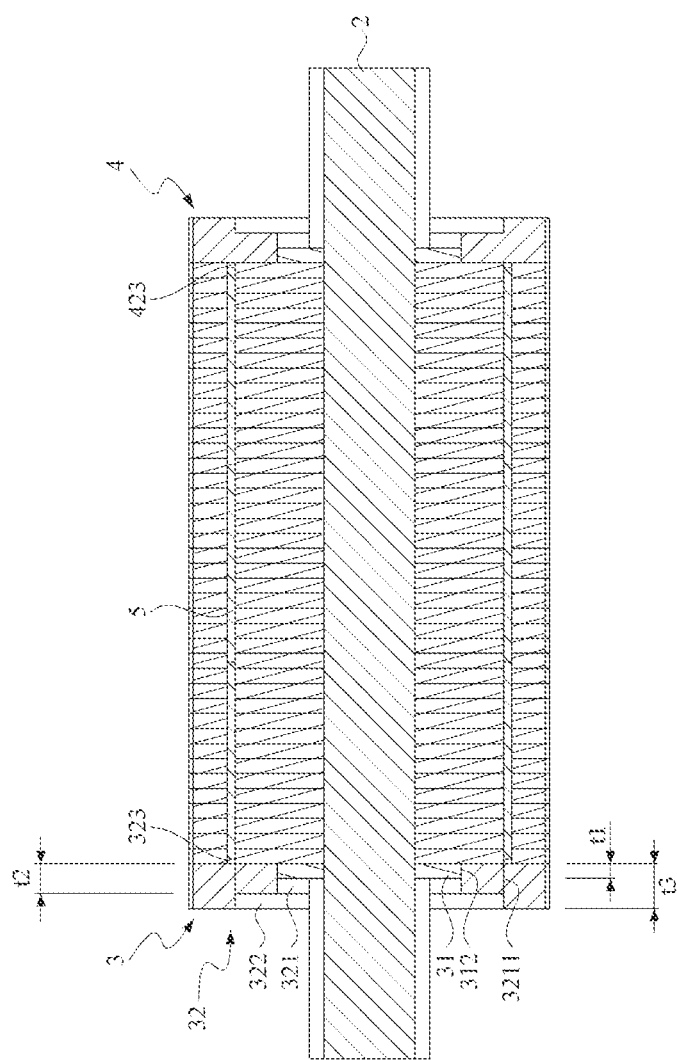
FIG. 5 is a schematic cross-sectional view of FIG. 4 along line B-B.

Refer to FIG. 3 through FIG. 5; where FIG. 3 is a schematic exploded view, at large, of a preferred rotor assembly for a permanent magnet motor in accordance with the present invention, FIG. 4 is a schematic perspective view of FIG. 3, and FIG. 5 is a schematic cross-sectional view of FIG. 4 along line B-B.

As shown in FIG. 3 to FIG. 5, the rotor assembly 100 for the permanent magnet motor includes a rotor body 1, a rotating shaft 2, two rotor end plates 3, 4, and a plurality of magnets 5 (only one labeled in the figure).

The rotor body 1, furnished with two opposing rotor ends 11, 12, is provided with 12 magnet-insertion holes 13 and a rotating-shaft connection hole 14, in which the magnet-insertion hole 13 is extended to pass through both the rotor ends 11, 12. Practically, the rotor body 1 is formed by stacking a plurality of silicon steel plates (not labeled in the figure) in parallel, and the magnet-insertion holes 13 and the rotating-shaft connection hole 14 are also formed by aligning corresponding central holes (not labeled in the figure) and surrounding holes (not labeled in the figure) at the silicon steel plates.

The rotating shaft 2 is fixedly mounted to the rotor body 1 by penetrating through the rotating-shaft connection hole 14 and connecting the two rotor ends 11, 12. Practically, the rotating shaft 2 can be fixed with the rotor body 1 by a pair of key and slot.

The rotor end plates 3, 4 are individually pressed to fit the two rotor ends 11, 12, respectively. Since the two rotor end plates 3, 4 are identically structured, thus only the rotor end plate 3 is raised as an example for the following description of the present invention. As shown, the rotor end plate 3 includes an inner ring structure 31 and an outer ring structure 32.

The inner ring structure 31, made of an iron-based material, has a rotating-shaft passing hole 311, a first outer-ring peripheral surface 312 and a first thickness t1, in which the rotating-shaft passing hole 311 allows the rotating shaft 2 to pass through. On the other hand, the outer ring structure 32, made of an aluminum-based material, includes a first radial segment 321, a second radial segment 322 and 12 magnet-positioning bumps 323 (only one labeled in the figure). In this embodiment, the iron-based material is a metal or alloy containing iron, and the aluminum-based material is another metal or alloy containing aluminum.

The first radial segment 321 of the outer ring structure 32, structured to surround the first outer-ring peripheral surface 312, has a second outer-ring peripheral surface 3211 and a second thickness t2 larger than the first thickness t1. The second radial segment 322 of the outer ring structure 32, integrally wrapping the second outer-ring peripheral surface 3211, has a third thickness t3 larger than the second thickness t2. In this embodiment, the iron-based material of the inner ring structure 31 is cast iron, and the aluminum-based material of the outer ring structure 32 is cast aluminum. In addition, practically, the manufacturing of the rotor end plate 3 is to firstly form the inner ring structure 31, and then to cast the outer ring structure 32 to encapsulate the inner ring structure 31. Thus, the first radial segment 321 of the outer ring structure 32 would weld to wrap the first outer-ring peripheral surface 312, such that the inner ring structure 31 and the outer ring structure 32 can be integrated as a unique piece.

The 12 magnet-positioning bumps 323, arranged into a star pattern in correspondence with the 12 magnet-insertion holes 13, are protrusively disposed on an inner surface of the outer ring structure 32 (i.e., the surface thereof facing the rotor body 1). Thereupon, while the rotor end plate 3 is pressed to fit the rotor end 11, each of the magnet-positioning bumps 323 would buckle one corresponding magnet-insertion hole 13. In this present invention, though the 12 magnet-positioning bumps 323 are arranged into the star pattern, yet, in some other embodiments, they can be arranged into other pattern that fits the arrangement of the corresponding 12 magnet-insetion hole 13.

On the other hand, the rotor end plate 4 can also include an inner ring structure 41 and an outer ring structure 42. Similarly, the inner ring structure 41 has a rotating-shaft passing hole 411, a first outer-ring peripheral surface 412 and a first thickness (not labeled in the figure), and the outer ring structure 42 includes a first radial segment (not labeled in the figure), a second radial segment (not labeled in the figure) and 12 magnet-positioning bumps 423 (only one labeled in the figure). In this embodiment, since the rotor end plate 4 and the rotor end plate 3 are identically structured, and thus details thereabout would be omitted herein.

The magnets 5 are axially disposed inside and along the corresponding magnet-insertion holes 13. After the two rotor end plates 3, 4 are pressed to fit the corresponding rotor ends 12, 13 of the rotor body 1, respectively, the magnet-positioning bumps 323, 423 would constrain firmly the respective magnets 5, inside the corresponding magnet-insertion holes 13, in between. In this embodiment, the magnets 5 are all permanent magnets.

Figure 6:
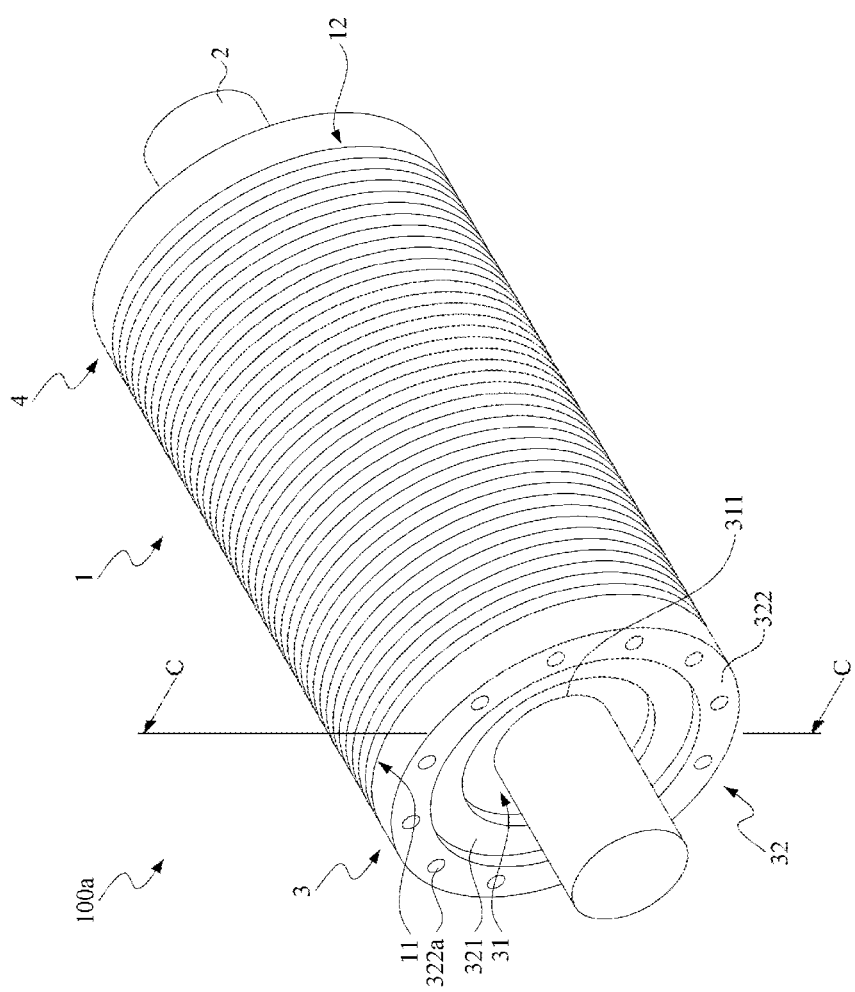
FIG. 6 is a schematic perspective view of the rotor assembly of FIG. 4 being furnished with drilling holes at the rotor end plate purposely for providing a dynamic balance to the permanent magnet motor in accordance with the present invention.
Figure 7:
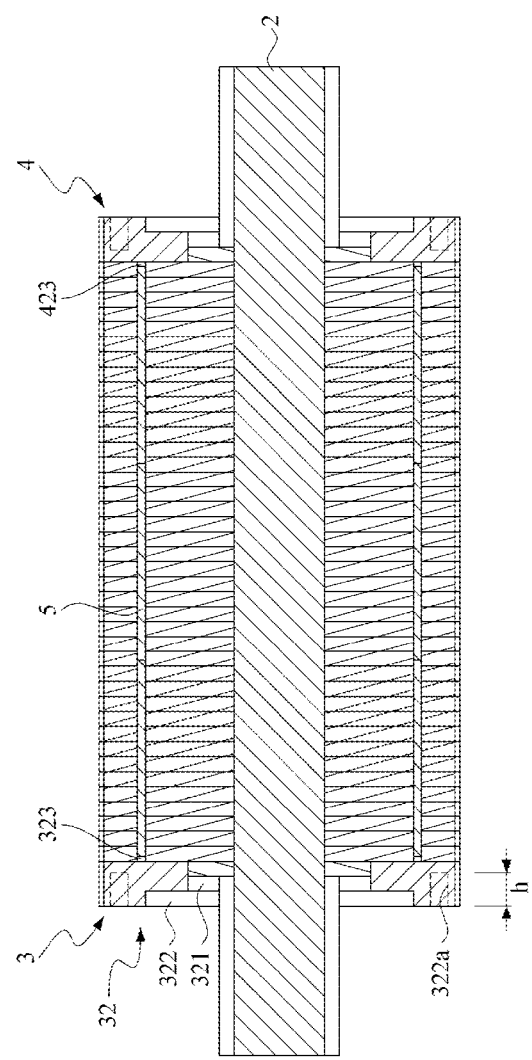
FIG. 7 is a schematic cross-sectional view of FIG. 6 along line C-C.

Refer also to FIG. 6 and FIG. 7; where FIG. 6 is a schematic perspective view of the rotor assembly of FIG. 4 being furnished with drilling holes at the rotor end plate purposely for providing a dynamic balance to the permanent magnet motor in accordance with the present invention, and FIG. 7 is a schematic cross-sectional view of FIG. 6 along line C-C.

As shown in FIG. 3 to FIG. 7, practically, when the rotor assembly 100 of the permanent magnet motor is set to undergo a test of dynamic balance, if a weight re-distribution is needed for the rotor assembly 100 of the permanent magnet motor caused, drilling holes on the outer ring structure 32 of the rotor end plate 3 or on the outer ring structure 42 of the rotor end plate 4 can be made to vary the entire weight distribution of the rotor assembly 100 of the permanent magnet motor. By having the rotor end plate 3 as an example, in this embodiment, a plurality of drilling holes 322a (only one labeled in the figure) is furnished to the second radial segment 322 of the outer ring structure 32 so as to reduce the weight of the rotor end plate 3. Thereupon, a mass-reduced rotor assembly 100a of the permanent magnet motor that can provide a stable rotational balance is obtained.

As described above, since the inner ring structure 31 of the rotor end plate 3 provided by this invention is made of an iron-based material, thus, when the rotor assembly 100 of the permanent magnet motor is operated to raise the temperature of the rotor body 1, the inner ring structure 31 made of an iron-based material having a low thermal expansion coefficient would be hard to be separated from the rotating shaft 2 by due to thermal expansion even that the heat of the rotor body 1 is transferred to the inner ring structure 31 via the rotating shaft 2.

On the other hand, since the outer ring structure 32 is made of an aluminum-based material, thus, when a mass-reduction process is performed on the outer ring structure 32, the machining for reducing the weight can be much easier for the hardness of the aluminum-based material is less than that of the iron-based material. In particular, in the second radial segment 322 of the outer ring structure 32, since the third thickness t3 is larger than any of the second thickness t2 and the first thickness t1, thus the depth h of the drilling hole 322s at the second radial segment 322 of the outer ring structure 32 can be larger. In this embodiment, though the depth h is ranged between the third thickness t3 and the second thickness t2, yet, practically, the depth h of the drilling hole 322a can be further increased by further extending into the magnet-positioning bumps 323. In other words, the drilling hole 322a can be dug deep into the magnet-positioning bump 323 so as to make the depth h larger than the third thickness t3.

In addition, since the first thickness t1 of the inner ring structure 31 is less than any of the second thickness t2 and the third thickness t3, and the inner ring structure 31 is made of the iron-based material with a higher hardness, thus machining load for providing a contact area with the rotating shaft 2 can be reduced, and the reduced thermal expansion provided by the iron-based material can also make the rotating-shaft passing hole 311 to firmly hold the rotating shaft 2.

In summary, in comparison with the conventional aluminum-made rotor end plate that would be easily separated from the rotating shaft by thermal expansion and the conventional iron-made rotor end plate that is hard to machine, the rotor end plate provided by this invention includes the inner ring structure made of the iron-based material and the outer ring structure made of the aluminum-based material. Thereupon, according to the present invention, with the inner ring structure to connect the rotating shaft, then the conventional separation problem caused by thermal expansion can be effectively resolved; and, further with the outer ring structure to adjust the weight, the machining would be much easier. In addition, since both the second thickness and the third thickness of the outer ring structure are larger than the first thickness of the inner ring structure, thus the machinable area and the allowed depth upon the outer ring structure can be effectively increased, and the area required to be machined at the thinner inner ring structure would be reduced. Upon such an arrangement, the rotor assembly of the permanent magnet motor and the rotor end plate of the rotor assembly according to this invention can provide less production cost, but more dynamic stability in operating the rotor assembly of the permanent magnet motor.

In addition, the magnet-positioning bumps on the rotor end plate of the present invention can be buckled into the corresponding magnet-insertion holes, and thus the magnets can be secured inside the individual magnet-insertion holes. Though the rotor end plates are provided in pair to opposing ends of the rotor body in the aforesaid embodiment, yet, in some other embodiments not shown herein, the rotor end plate can be only provided to one single side of the rotor body.

While the present invention has been particularly shown and described with reference to a preferred embodiment, it will be understood by those skilled in the art that various changes in form and detail may be without departing from the spirit and scope of the present invention.

What is claimed is:

1. A rotor assembly of a permanent magnet motor, comprising:
 a rotor body, having two rotor ends;
 a rotating shaft, penetrating through the two rotor ends of the rotor body; and
 two rotor end plates, pressed correspondingly to fit the two rotor ends, each of the two rotor end plates including:
  an inner ring structure, made of an iron-based material, having a first outer-ring peripheral surface and a first thickness, used to sleeve the rotating shaft; and
  an outer ring structure, made of an aluminum-based material, including:

a first radial segment, wrapping the first outer-ring peripheral surface, having a second outer-ring peripheral surface and a second thickness larger than the first thickness; and a second radial segment, wrapping integrally the second outer-ring peripheral surface as a unique piece, having a third thickness larger than the second thickness.

2. The rotor assembly of the permanent magnet motor of claim 1, wherein the rotor body is furnished with a plurality of magnet-insertion holes, and each of the plurality of magnet-insertion holes is extended to connect the two rotor ends.

3. The rotor assembly of the permanent magnet motor of claim 2, further including a plurality of magnets, each of the plurality of magnets being disposed inside one of the plurality of magnet-insertion holes.

4. The rotor assembly of the permanent magnet motor of claim 3, wherein the outer ring structure has a plurality of magnet-positioning bumps; wherein, when the two rotor end plates are pressed to fit the corresponding two rotor ends, the plurality of magnet-positioning bumps is buckled respectively into the plurality of magnet-insertion holes so as to secure the plurality of magnets thereinside.

5. The rotor assembly of the permanent magnet motor of claim 1, wherein the rotor body is furnished with a rotating-shaft connection hole, the inner ring structure is furnished with a rotating-shaft passing hole corresponding to the rotating-shaft connection hole, and the rotating shaft penetrates through the rotating-shaft connection hole and the rotating-shaft passing hole.

6. A rotor end plate, applied to be pressed to fit a rotor end of a rotor body, comprising:

an inner ring structure, made of an iron-based material, having a first outer-ring peripheral surface and a first thickness, used to sleeve a rotating shaft of the rotor body; and an outer ring structure, made of an aluminum-based material, including:

a first radial segment, wrapping the first outer-ring peripheral surface, having a second outer-ring peripheral surface and a second thickness larger than the first thickness; and a second radial segment, wrapping integrally the second outer-ring peripheral surface as a unique piece, having a third thickness larger than the second thickness.

7. The rotor end plate of claim 6, wherein the rotor body is furnished with a plurality of magnet-insertion holes, the plurality of magnet-insertion hole is furnished individually thereinside a plurality of magnets, and the outer ring structure has a plurality of magnet-positioning bumps; wherein, when the rotor end plate is pressed to fit the rotor end, the plurality of magnet-positioning bumps is buckled individually into the plurality of magnet-insertion holes so as to secure the plurality of magnets thereinside.

8. The rotor end plate of claim 6, wherein the rotor body is furnished with a rotating-shaft connection hole, the inner ring structure is furnished with a rotating-shaft passing hole corresponding to the rotating-shaft connection hole, and the rotating shaft penetrates through the rotating-shaft connection hole and the rotating-shaft passing hole.

* * * * *